US012801306B2

(12) United States Patent
Qiu et al.

(10) Patent No.: US 12,801,306 B2
(45) Date of Patent: Nov. 17, 2026

(54) MULTI-CONTROLLER STORAGE ARRAY, STORAGE SYSTEM, DATA PROCESSING METHOD, AND STORAGE MEDIUM

(71) Applicant: Suzhou MetaBrain Intelligent Technology Co., Ltd., Suzhou (CN)

(72) Inventors: Fengli Qiu, Suzhou (CN); Yonggang Wang, Suzhou (CN); Shuai Zhao, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/168,450

(22) PCT Filed: Sep. 27, 2024

(86) PCT No.: PCT/CN2024/121923
§ 371 (c)(1),
(2) Date: Sep. 24, 2025

(87) PCT Pub. No.: WO2025/156686
PCT Pub. Date: Jul. 31, 2025

(65) Prior Publication Data

US 2026/0111140 A1 Apr. 23, 2026

(30) Foreign Application Priority Data

Jan. 24, 2024 (CN) ........................ 202410096344.0

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS 11,836,371 B1 * 12/2023 Hua ...................... G06F 3/0631
2008/0301256 A1 * 12/2008 McWilliams ....... G06F 12/0806
714/E11.178

(Continued)

FOREIGN PATENT DOCUMENTS

CN 102081584 A 6/2011
CN 103092786 A 5/2013

(Continued)

OTHER PUBLICATIONS

International Search Report of corresponding PCT application (PCT/CN2024/121923) Jan. 1, 2025, 5 pages.

(Continued)

*Primary Examiner* — Masud K Khan
(74) *Attorney, Agent, or Firm* — COOPER LEGAL GROUP LLC

(57) ABSTRACT

Embodiments of the present application provide a multi-controller storage array, a storage system, a data processing method, and a storage medium. The storage array includes a four-controller storage module, and the four-controller storage module includes two controller pairs and a storage expansion disk enclosure. The two controller pairs are connected via Ethernet. Any controller pair of the two controller pairs includes two controller nodes. Each controller node is connected to the storage expansion disk enclosure for shared access to the storage expansion disk enclosure. Each controller node is provided with a cache unit, and any controller node, in response to a write data request, determines a target mirror controller node corresponding to the controller node, wherein a cache mirror of the controller node is stored in a cache unit of the target mirror controller node.

17 Claims, 9 Drawing Sheets

(56) References Cited

U.S. PATENT DOCUMENTS

| | | | |
|---|---|---|---|
| 2009/0132765 A1 | 5/2009 | Wang et al. | |
| 2019/0354301 A1* | 11/2019 | Rajgopal ............... | G06F 3/0658 |
| 2022/0179812 A1 | 6/2022 | Lin et al. | |

FOREIGN PATENT DOCUMENTS

| | | |
|---|---|---|
| CN | 112543922 A | 3/2021 |
| CN | 114003181 A | 2/2022 |
| CN | 114816270 A | 7/2022 |
| CN | 116483263 A | 7/2023 |
| CN | 116974489 A | 10/2023 |
| CN | 117632808 A | 3/2024 |

OTHER PUBLICATIONS

Written Opinion of International Searching Authority of corresponding PCT application (PCT/CN2024/121923) Jan. 1, 2025, 7 pages.
First Office Action of corresponding CN priority application (CN202410096344.0) Mar. 7, 2024, 8 pages.
Notification to Grant Patent Right for Invention of corresponding CN priority application (CN202410096344.0) Apr. 3, 2024, 3 pages.

* cited by examiner

MULTI-CONTROLLER STORAGE ARRAY, STORAGE SYSTEM, DATA PROCESSING METHOD, AND STORAGE MEDIUM

CROSS-REFERENCE TO RELATED APPLICATION

This application is the national phase application of International Application No. PCT/CN2024/121923, filed Sep. 27 2024, which claims priority to Chinese Patent Application No. 202410096344.0, filed with the China National Intellectual Property Administration on Jan. 24, 2024, and entitled "Multi-Controller Storage Array, Storage System, Data Processing Method, and Storage Medium". The contents of International Application No. PCT/CN2024/121923 and Chinese Patent Application No. 202410096344.0 are incorporated herein by reference in their entireties.

FIELD

The present application relates to a multi-controller storage array, a storage system, a data processing method, and a storage medium.

BACKGROUND

In order to ensure high availability and high reliability, storage arrays widely adopt redundancy technologies, such as controller redundancy, dual-port hard disks, power redundancy, and fan redundancy.

Generally, a storage array with more than 2 controllers is referred to as a multi-controller storage array. By increasing a number of controllers in the storage array, the performance of the storage system might be enhanced. For example, parallel processing of storage requests increases the throughput of read/write operations. In addition, the scalability and fault redundancy capability of the storage system might also be enhanced.

At present, the multi-controller storage array includes loosely coupled multi-controller storage arrays and tightly coupled multi-controller storage arrays. Taking a four-controller configuration as an example, in a loosely coupled multi-controller storage array, two controller pairs are provided. Each controller pair includes two controller nodes, and the two controller nodes in each controller pair share a backend hard disk. However, if both controller nodes in one controller pair fail, the backend hard disk shared by that controller pair might not be accessed for read/write operations. In contrast, in a tightly coupled multi-controller storage array, a plurality of controller nodes share a backend hard disk. However, in the tightly coupled multi-controller storage array, all controller nodes are located within a same fault domain. For example, if a backplane of a chassis accommodating the plurality of controller nodes fails, all of the controller nodes are unable to continue providing normal services. Accordingly, the inventors have recognized that both the existing loosely coupled multi-controller storage arrays and the tightly coupled multi-controller storage arrays still suffer from relatively low availability.

SUMMARY

In a first aspect, embodiments of the present application provide a multi-controller storage array. The storage array includes a four-controller storage module, the four-controller storage module including two controller pairs and a storage expansion disk enclosure,

- wherein the two controller pairs are connected based on Ethernet;
- each controller pair of the two controller pairs includes two controller nodes, and each controller node is connected to the storage expansion disk enclosure to perform shared access to the storage expansion disk enclosure; and
- each controller node is provided with a cache unit, any controller node determines a target mirror controller node corresponding to the controller node in response to a write data request, and a cache mirror of the controller node is stored in a cache unit of the target mirror controller node.

In a second aspect, embodiments of the present application provide a storage system based on a multi-controller storage array. The storage system includes a host and the multi-controller storage array according to the first aspect of the embodiments of the present application, wherein

- the host is separately connected to all controller nodes in the multi-controller storage array.

In a third aspect, embodiments of the present application provide a data processing method based on a multi-controller storage array. The method is applied to the storage system based on a multi-controller storage array according to the second aspect of the embodiments of the present application. The method includes:

- in response to a write data request issued by a host, acquiring, by any controller node serving as a primary controller node, to-be-written data, and storing the to-be-written data in a cache unit of the controller node;
- determining, by the primary controller node, a target mirror controller node corresponding to the primary controller node;
- performing, by a cache unit of the target mirror controller node, cache mirroring backup on the to-be-written data stored in the primary controller node;
- transmitting, by the primary controller node, a completion response corresponding to the write data request to the host after backup is completed; and
- flushing the to-be-written data stored in the cache unit of the primary controller node to a storage expansion disk enclosure.

In a fourth aspect, embodiments of the present application provide a non-transitory computer-readable storage medium. The non-transitory computer-readable storage medium stores computer-readable instructions which, when executed by a processor, perform the data processing method based on a multi-controller storage array according to the third aspect of the embodiments of the present application.

The details of one or more embodiments of the present application are set forth in the accompanying drawings and the description below. Other features and advantages of the present application will become apparent from the specification, the drawings, and the claims.

BRIEF DESCRIPTION OF THE DRAWINGS

In order to describe the technical solutions in the embodiments of the application more clearly, the drawings required to be used in the embodiments will be simply introduced below. It is apparent that the drawings described below are only some embodiments of the application. Other drawings may further be obtained by those skilled in the art according to these drawings without creative work.

DETAILED DESCRIPTION

The technical solutions in embodiments of the present application will be described below with reference to the drawings in the embodiments of the present application.

RoCE: Remote Direct Memory Access over Converged Ethernet, a clustered network communication protocol that enables remote direct memory access (RDMA) over Ethernet;

NVMe: Non-transitory Memory Express, a host controller interface specification for a non-transitory memory;

SSD: Solid State Disk;

EBOF: Ethernet Bunch of Flash;

CPU: Central Processing Unit;

For making objectives, technical solutions, and advantages of the embodiments of the present application clearer, the implementations of the present application will further be described below with reference to the drawings in detail. However, those skilled in the art will appreciate that various technical details are included in the implementations of the present application to facilitate a better understanding of the present application. The technical solutions claimed herein might be implemented even in the absence of the specific technical details and various modifications or variations provided in the following implementations. The division of the following embodiments is for descriptive convenience only and shall not constitute any limitation to the specific implementation of the present application. The embodiments may be combined with or referenced by each other without contradiction.

With increasing requirements for data storage, redundant technologies are widely adopted in order to enhance the high availability and high reliability of storage arrays, such as controller redundancy, dual-port hard disks, power redundancy, fan redundancy, and the like.

Figure 1:
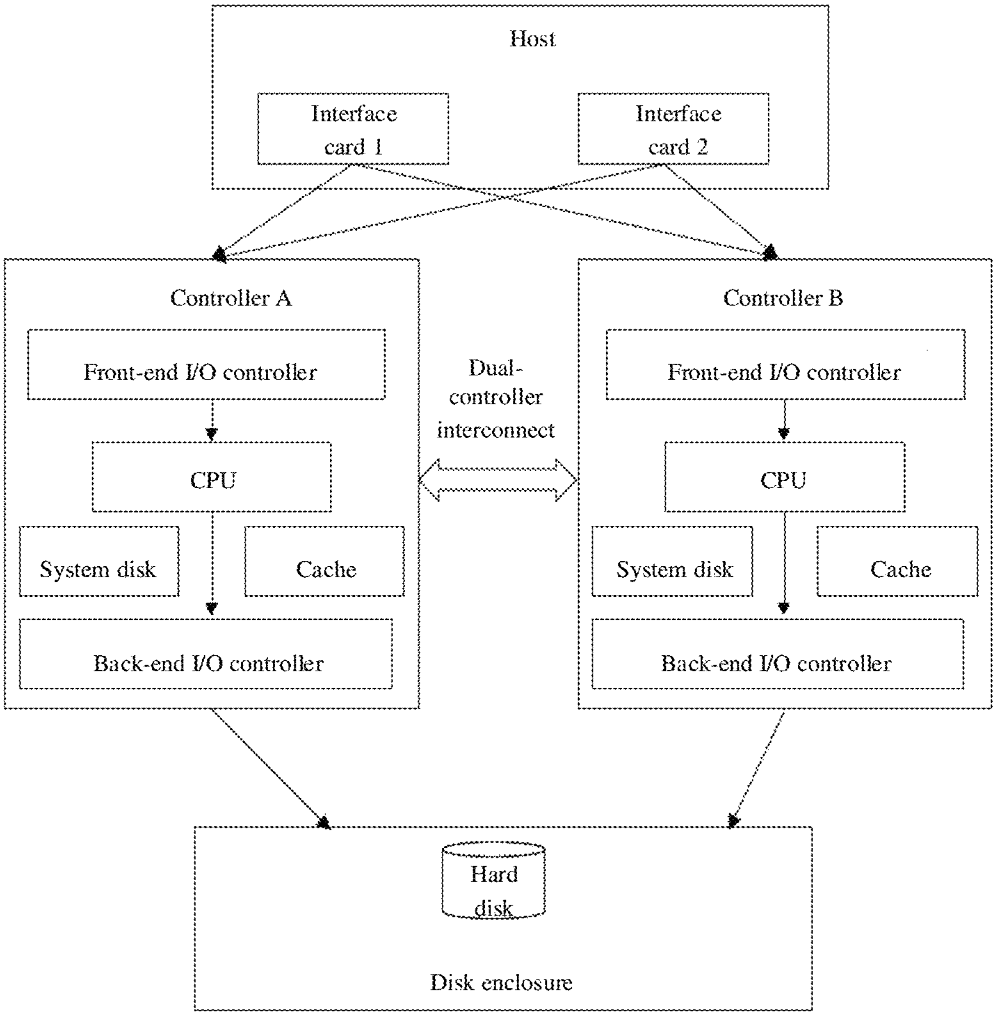
FIG. 1 is a schematic structural diagram of an existing dual-controller storage system.

Referring to FIG. 1, a schematic structural diagram of an existing dual-controller storage system is illustrated. The existing dual-controller storage system includes a host, a controller A, a controller B, and a disk enclosure. The host includes an interface card 1 and an interface card 2, where the interface card is a host bus adapter (HBA). The host bus adapter functions as a network and switching interface and is a board card that might be inserted into a computer or a mainframe. The interface card 1 is HBA1, and the interface card 2 is HBA2. HBA1 and HBA2 are mounted on the host and configured to be connected to a storage array storing data.

The storage array includes two controllers, namely a controller A and a controller B. Each controller includes a front-end input/output (I/O) controller, a central processing unit (CPU), a system hard disk, a cache, and a back-end input/output (I/O) controller. The front-end I/O controller is configured to connect to the host; the CPU is configured to process control and service logic; the cache, disposed before a low-speed back-end hard disk, is a high-speed random access device, and is typically implemented with a memory as a cache device, to improve storage performance; and the back-end I/O controller is configured to communicate with hard disks in the disk enclosure for read/write operations on the hard disks, where the hard disks are configured to enable persistent storage of processed user data.

However, dual-controller storage arrays still might not meet higher storage requirements. Therefore, multi-controller storage arrays have been developed. A multi-controller storage array refers to a storage array having more than two controllers. By increasing ta number of controllers in the storage array, the storage performance, availability, and scalability of the storage array might be enhanced. Specific advantages include the following.

First, increasing the number of controllers might significantly improve the storage performance of the storage array. A plurality of controllers might process storage requests in parallel, thereby increasing the throughput of read and write operations, which is particularly important for applications requiring high performance, such as big data analytics, virtualization, and high-performance computing. In addition, increasing the number of controllers allows the storage array to support larger storage capacity. When enterprises need to expand storage capacity to meet growing data demands, they might simply add more disk drives and incorporate them into a storage cluster.

By increasing the number of controllers, redundancy and high availability might also be achieved. If one controller fails, other controllers might continue to process requests, thereby preventing system interruptions and data loss. The plurality of controllers might also be configured to achieve workload balancing, where storage requests are distributed among different controllers to prevent any one controller from being overloaded, thereby improving system stability and performance. Furthermore, the system exhibits high scalability, enabling gradual expansion of the storage cluster as needed without redesigning the entire storage architecture.

At present, the multi-controller storage arrays include loosely coupled multi-controller storage arrays and tightly coupled multi-controller storage arrays. In this embodiment, a four-controller (4-controller) storage array is used as an example for illustration.

Figure 2:
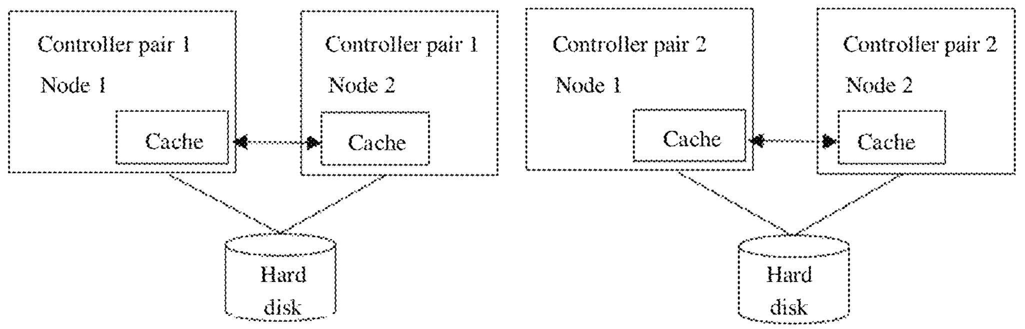
FIG. 2 is a schematic structural diagram of an existing loosely coupled multi-controller storage array.

Referring to FIG. 2, a schematic structural diagram of an existing loosely coupled multi-controller storage array is illustrated. A four-controller loosely coupled multi-controller storage array includes two controller pairs, each controller pair including two nodes (Node 1 and Node 2). Two nodes of one controller pair share a back-end hard disk, and caches s of one controller pair are mirrored with each other. However, the disadvantage of the four-controller configuration is that the back-end hard disk might only be accessed by the two nodes in the same controller pair. Since the two nodes in the same controller pair are hardware-integrated, failures tend to occur simultaneously. When both nodes in the same controller pair fail and might not continue providing services, half of the back-end hard disk in the four-controller storage array becomes unavailable, which severely affects the availability of the four-controller storage array.

Figure 3:
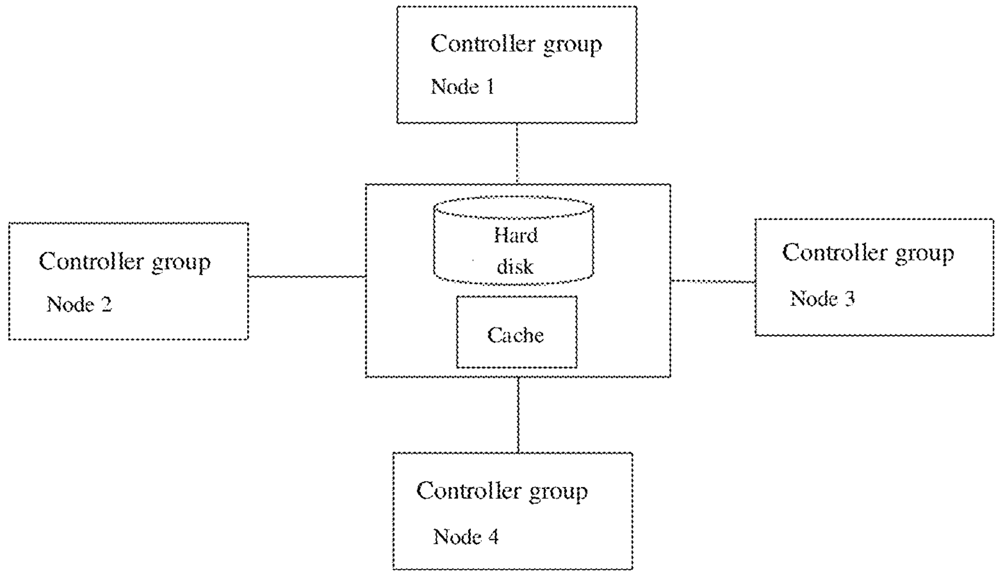
FIG. 3 is a schematic structural diagram of an existing tightly coupled multi-controller storage array.

Referring to FIG. 3, a schematic structural diagram of an existing tightly coupled multi-controller storage array is illustrated. A four-controller tightly coupled multi-controller storage array includes one controller group, in which four tightly coupled nodes (Node 1, Node 2, Node 3, and Node 4) share a back-end hard disk and a cache. However, because the four nodes in the controller group are placed within a same chassis, all four controllers reside within a single fault domain. When a single point of failure occurs in the fault domain, availability is affected. For example, when a backplane of the chassis housing the four controllers fails, all four controllers may become unavailable. In addition, since the four controllers share the cache, the architecture lacks a cache redundancy strategy.

Accordingly, in order to improve the availability of storage arrays, this embodiment provides a multi-controller storage array. The storage array includes one or more four-controller storage modules, each including two controller pairs and a storage expansion disk enclosure, and the two controller pairs being connected via Ethernet.

Each controller pair includes two controller nodes, and each controller node is connected to the storage expansion disk enclosure to perform shared access to the storage expansion disk enclosure. To be specific, in a four-controller storage module, all four controller nodes might share access to the same storage expansion disk enclosure. The storage expansion disk enclosure includes disks for storing data, and a disk type may be selected according to practical application requirements, without limitation in this embodiment.

In practical implementation, two controller nodes in each controller pair of the four-controller storage module may be hardware-integrated. Even if the two controller nodes of one controller pair reside in a same fault domain and fail, the other controller pair in the four-controller storage module might still normally access the entire storage expansion disk enclosure. This avoids the problem in the loosely coupled multi-controller storage array where the failure of two nodes in the same controller pair causes half of the back-end hard disks to become unavailable, thereby improving the availability of the multi-controller storage array.

Each controller node is provided with a cache unit, any controller node determines a target mirror controller node corresponding to the controller node in response to a write data request, and a cache mirror of the controller node is stored in the cache unit of the target mirror controller node.

The number of four-controller storage modules in the multi-controller storage array might be selected based on practical application requirements. For example, the storage array may include only one four-controller storage module, resulting in a four-controller storage array. Alternatively, the storage array may include two four-controller storage modules, resulting in an eight-controller storage array. In scenarios requiring larger storage capacity, the storage array may be expanded to include four four-controller storage modules, resulting in a sixteen-controller storage array.

In some implementations, the two controller pairs of the four-controller storage module are connected via Ethernet. To reduce the latency of cache mirroring, connection between the two controller pairs may adopt a remote direct memory access (RDMA) network connection. An RDMA network allows direct read and write access to a memory of another processor from a memory of one processor without occupying CPU resources, thereby significantly improving data transmission performance and reducing latency.

For example, the two controller pairs may be connected via an RDMA over Converged Ethernet (RoCE) network. The RoCE network combines features of RDMA and Ethernet switches, allowing efficient direct memory access over Ethernet to provide low-latency and high-throughput data transmission.

In other implementations, in addition to the RoCE network, other types of RDMA networks may also be applied according to practical requirements, such as internet wide area RDMA protocol (iWARP). iWARP is an RDMA technology based on transmission control protocol/Internet protocol (TCP/IP). In practical application, different RDMA networks and corresponding hardware, such as network interface cards, may be selected and configured based on application requirements.

The storage expansion disk enclosure may be implemented as a non-transitory memory express solid state drive (NVMe SSD) storage expansion disk enclosure based on Ethernet Bunch of Flash (EBOF), and the number of hard disks may be increased based on practical application requirements to meet storage demands.

The cache unit may be a memory, or may alternatively adopt other types of high-speed random access devices, such as a cache, which is a memory hierarchy located between a CPU and a main memory. A type of a cache unit device may be selected according to practical application requirements, without limitation in this embodiment.

Figure 4:
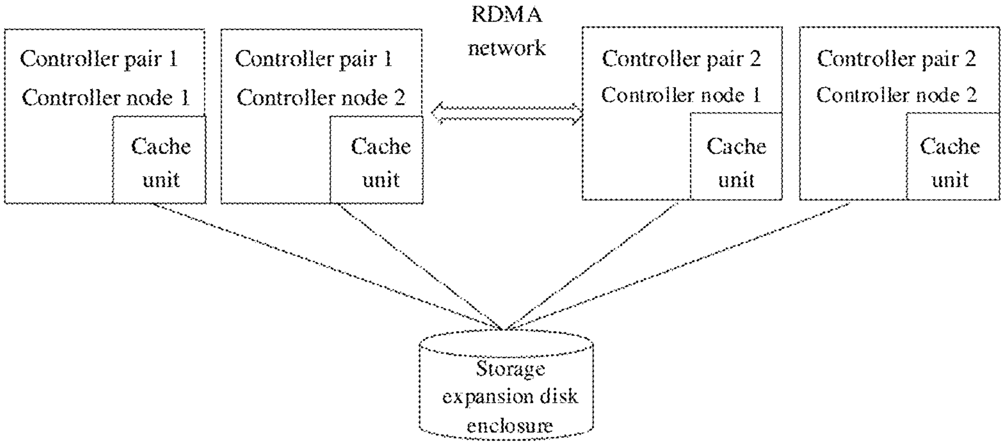
FIG. 4 is a schematic diagram of a multi-controller storage array according to an embodiment of the present application.

Referring to FIG. 4, a schematic diagram of a multi-controller storage array provided in an embodiment of the present application is illustrated. The multi-controller storage array includes one four-controller storage module group, resulting in a four-controller storage array. The four-controller storage array includes a controller pair 1 and a controller pair 2. Each controller pair includes two controller nodes, denoted as controller node 1 and controller node 2, respectively. Each controller node includes one cache unit. The controller pair 1 and the controller pair 2 are connected via an RDMA network, such as an RoCE network. All four controller nodes are connected to a storage expansion disk enclosure, such as an EBOF storage expansion disk enclosure, whereby the four controller nodes might share access to the hard disks of the storage expansion disk enclosure.

In some implementations, a storage array includes two four-controller storage modules, i.e., four controller pairs in total. Each controller pair includes two controller nodes, thereby forming an eight-controller storage array. A cache unit of each controller node may be a memory, or alternatively another type of high-speed random access device. In the eight-controller storage array, one controller pair of any four-controller storage module is connected with one controller pair of another four-controller storage module via an Ethernet network. For example, an RoCE or other type of RDMA network may be employed to enhance data transmission performance and reduce latency. A storage expansion disk enclosure may be implemented as an EBOF-based storage expansion disk enclosure, and a number of hard disks may be increased according to practical application requirements to meet storage demands.

Figure 5:
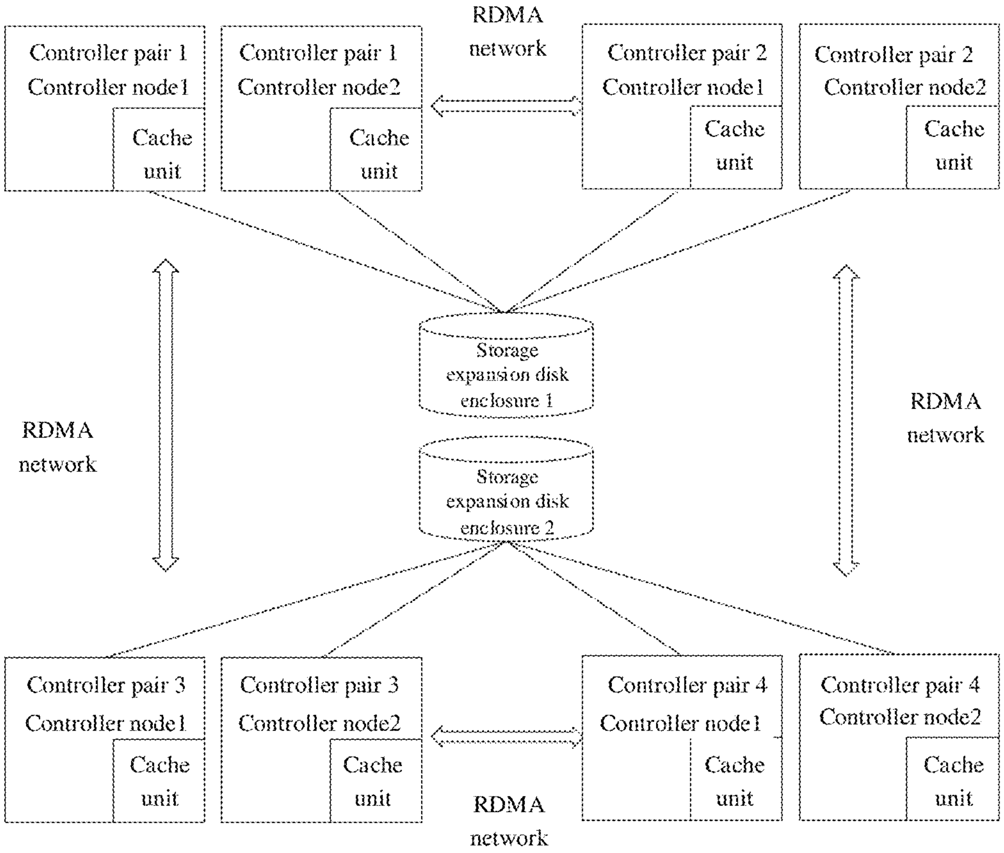
FIG. 5 is a schematic diagram of a multi-controller storage array according to an embodiment of the present application.

Referring to FIG. 5, a schematic diagram of a multi-controller storage array provided in an embodiment of the present application is illustrated. The multi-controller storage array is an eight-controller storage array, including two four-controller storage module group. A first four-controller storage module group includes a controller pair 1, a controller pair 2, and a storage expansion disk enclosure 1; a second four-controller storage module group includes a controller pair 3, a controller pair 4, and a storage expansion disk enclosure 2. The storage expansion disk enclosures may be EBOF enclosures. One controller pair of any four-controller storage module is connected with one controller pair of another four-controller storage module via a remote direct memory access (RDMA) network, such as an RoCE network. In some embodiments, the controller pair 1 and the controller pair 2 in the first four-controller storage module group are connected via an RoCE network; the controller pair 3 and the controller pair 4 in the second four-controller storage module group are connected via an RoCE network; the controller pair 1 of the first four-controller storage module group and the controller pair 3 of the second four-controller storage module group are connected via an RoCE network, and the controller pair 2 of the first four-controller storage module group and the controller pair 4 of the second four-controller storage module group are connected via an RoCE network. Each controller pair includes two controller nodes, denoted as a controller node 1 and a controller node 2, respectively, and each controller node includes one cache unit.

Although the eight-controller storage array includes two storage expansion disk enclosures, the four controller pairs are connected via the RoCE network. Thus, even if the controller pair 3 fails, the controller pair 1 may still access EBOF 2 via the ROCE network between the controller pair 2 and the controller pair 4.

The embodiment further provides a storage system based on a multi-controller storage array. The storage system includes a host and the multi-controller storage array of the embodiment, where the host is separately connected to all controller nodes of the multi-controller storage array.

Figure 6:
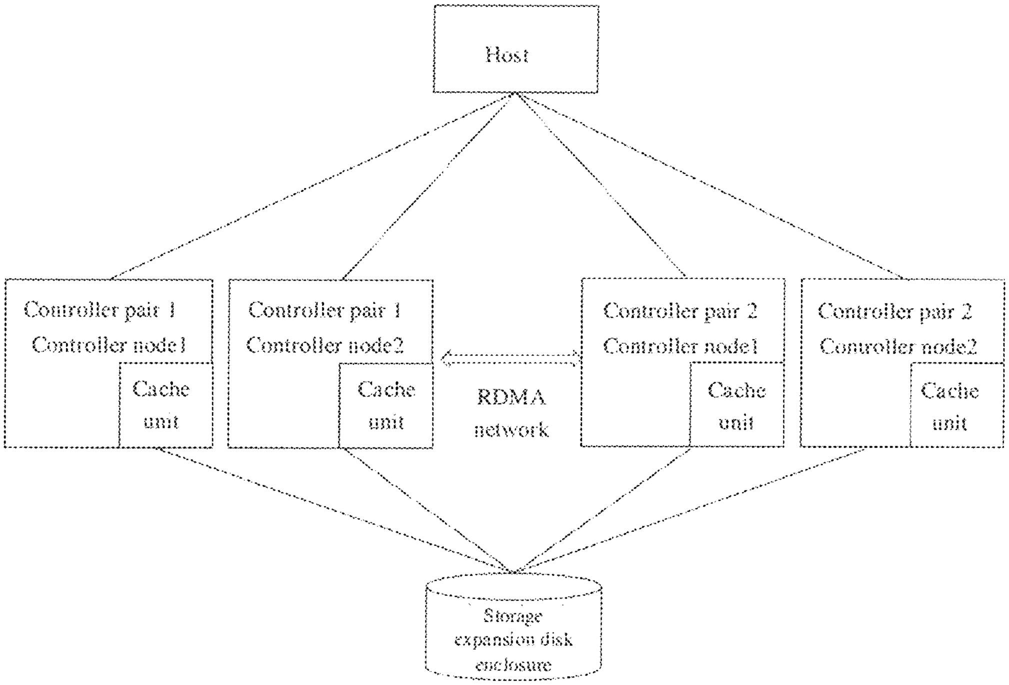
FIG. 6 is a schematic diagram of a storage system based on a multi-controller storage array according to an embodiment of the present application.

Referring to FIG. 6, a schematic diagram of a storage system based on a multi-controller storage array according to an embodiment of the present application is illustrated. Taking a four-controller storage array as an example, a host is connected to all four controller nodes in the storage system.

The host is configured with a multipath management thread. For each read/write operation for the storage array, the multipath management thread selects, among all controller nodes, a primary controller node for a current read/write operation.

In some implementations, the multipath management thread may designate a predefined target controller node as the primary controller node.

As shown in FIG. 6, a controller node 1 of a controller pair 1 may be designated as the primary controller node. When the controller node 1 of the controller pair 1 fails, a controller node 2 of the controller pair 1 may be designated as the primary controller node. When the controller node 2 of the controller pair 1 fails or when the controller node 1 of the controller pair 1 recovers from a failure, the controller node 1 of the controller pair 1 may continue to be designated as the primary controller node.

In other implementations, other predefined manners may also be adopted. For example, when the controller node 2 of the controller pair 1 fails, the controller node 1 of a controller pair 2 may be designated as the primary controller node by polling. There is no limitation in this embodiment.

In another implementation, the multipath management thread is configured to poll all controller nodes to determine the primary controller node for a current read/write operation.

For example, in a first read/write operation, a controller node 1 of a controller pair 1 is designated as the primary controller node; in a second read/write operation, a controller node 2 of the controller pair 1 is designated as the primary controller node; in a third read/write operation, a controller node 1 of a controller pair 2 is designated as the primary controller node; in a fourth read/write operation, a controller node 2 of the controller pair 2 is designated as the primary controller node; in a fifth read/write operation, the controller node 1 of the controller pair 1 is designated as the primary controller node again. The process cycles in this manner. If the controller node designated by polling in a certain read/write operation fails, the next controller node is designated as the primary controller node.

In another implementation, the multipath management thread may select a primary controller node for a current read/write operation among all controller nodes according to a preset rule.

For example, the multipath management thread may acquire a current load of each of a plurality of controller nodes, and select a controller node with the smallest current load as the primary controller node for the current read/write operation. By selecting the controller node with the smallest load, a response speed of data processing might be improved, avoiding the situation in which a single controller node undertakes excessive tasks and suffers from reduced response speed or even crash.

For example, each controller node may be configured with data objects or service objects to be processed. The multipath management thread determines the primary controller node for the current read/write operation according to the data object or the service object involved in the read/write operation.

For instance, a controller node 1 of a controller pair 1 may be configured to process a service object A and a service object B; a controller node 2 of the controller pair 1 may be configured to process a service object C, a service object D, and a service object E; a controller node 1 of a controller pair 2 may be configured to process a data object A, a data object B, and a data object C; and a controller node 2 of the controller pair 2 may be configured to process a data object E and a data object F.

In other implementations, a method for selecting a primary controller node by a multipath management thread may also be customized according to actual application requirements. For example, a controller node with higher processing capacity may be configured to handle heavy workloads, or a controller node with higher processing speed may be configured to handle services with high timeliness requirements.

The embodiment further provides a data processing method based on a multi-controller storage array, which is applied to the storage system based on a multi-controller storage array provided in the embodiment.

Figure 7:
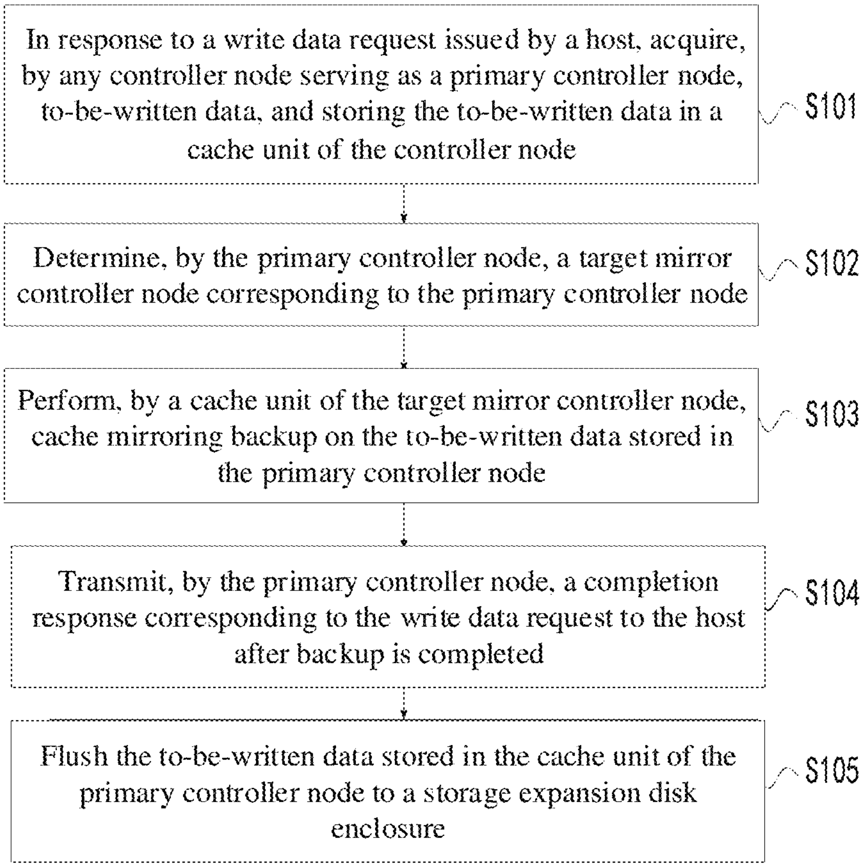
FIG. 7 is a flowchart of steps of a data processing method based on a multi-controller storage array according to an embodiment of the present application.

Referring to FIG. 7, a flowchart of steps of a data processing method based on a multi-controller storage array according to an embodiment of the present application is illustrated. The method may include the following steps:

S101: In response to a write data request issued by a host, acquiring, by any controller node serving as a primary controller node, to-be-written data, and storing the to-be-written data in a cache unit of the controller node.

During each read/write operation for a storage array, a multipath management thread in the host determines the primary controller node. The primary controller node, in response to receiving the write data request from the host, acquires and stores the to-be-written data in a cache unit.

The cache unit may be a memory or another high-speed access device. Since a storage capacity of the cache unit is limited, a processing queue may be configured in the cache unit, where latest to-be-written data is appended to the end of the queue. When no storage space is available, data with earliest timestamp in the queue is discarded.

S102: Determining, by the primary controller node, a target mirror controller node corresponding to the primary controller node.

To improve cache redundancy, it is necessary to determine the target mirror controller node for the primary controller node for performing cache mirroring backup.

In some implementations, when the target mirror controller node corresponding to the primary controller node is determined, any controller node in a controller pair that is different from the controller pair to which the primary controller node belongs is selected as the target mirror controller node corresponding to the primary controller node.

When each controller node in the controller pair that is different from the controller pair to which the primary controller node belongs fails, another controller node in the controller pair to which the primary controller node belongs is selected as the target mirror controller node corresponding to the primary controller node.

By preferentially selecting a controller node in a different controller pair as the target mirror controller node, data loss of cached data due to simultaneous failure of both controller nodes encapsulated in the same hardware might be avoided. Only when all controller nodes in the controller pair different from the controller pair to which the primary controller node belongs fail, a controller node in the same controller pair as the primary controller node is selected as the target mirror controller node corresponding to the primary controller node.

In some implementations, when the target mirror controller node corresponding to the primary controller node is determined, the primary controller node may acquire a load condition of each of a plurality of controller nodes and select the controller node with the smallest load as the target mirror controller node.

Selecting the controller node with the smallest load as the target mirror controller node enables the target mirror controller node to quickly complete the write operation when the primary controller node fails, thereby reducing the latency of the write operation.

S103: Performing, by a cache unit of the target mirror controller node, cache mirroring backup on the to-be-written data stored in the primary controller node.

Figure 8:
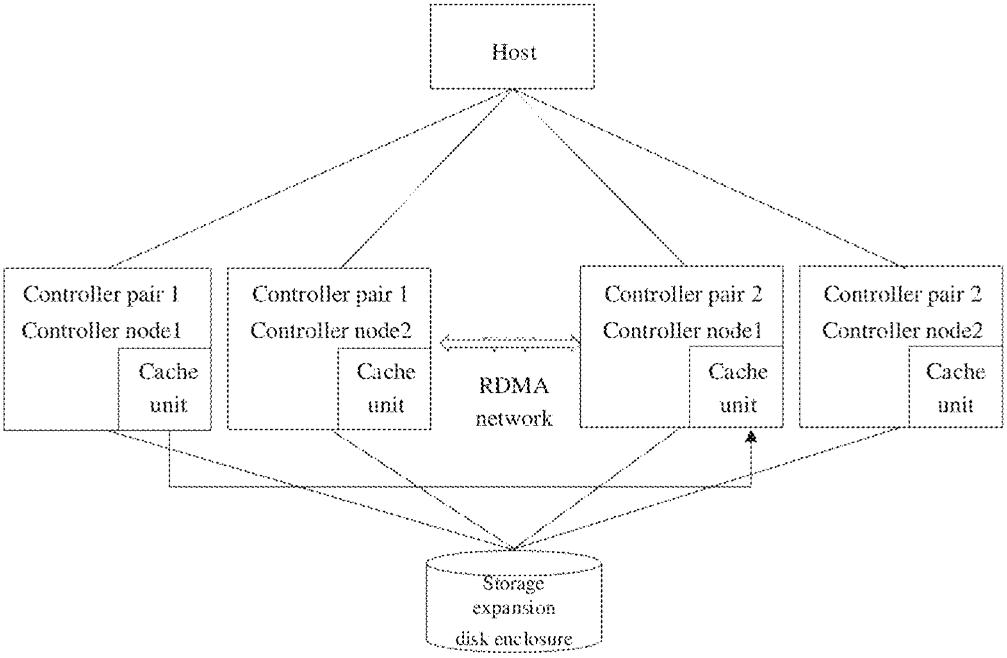
FIG. 8 is a schematic diagram of cache mirroring backup according to an embodiment of the present application.

Referring to FIG. 8, a schematic diagram of cache mirroring backup according to an embodiment of the present application is illustrated. Taking a four-controller storage array as an example, when a host issues a write data request to a controller node 1 of a controller pair 1 for a current operation, a target mirror controller node of the controller node 1 of the controller pair 1 is a controller node 1 of a controller pair 2. Through a remote direct memory access (RDMA) network, such as an RoCE network, the to-be-written data is transmitted to the controller node 1 of the controller pair 2, where the data is backed up in a cache unit of the controller node 1.

S104: Transmitting, by the primary controller node, a completion response corresponding to the write data request to the host after backup is completed.

In this method, the process of transmitting, by the host, the to-be-written data to the primary controller node and the process of storing, by the primary controller node, the to-be-written data into hard disks of a storage expansion disk enclosure may be executed separately. When cache mirroring backup is completed, the primary controller node may transmit a completion response corresponding to the write data request to the host without waiting for the to-be-written data to be fully written into the hard disks. In this manner, the host might proceed with a next processing logic, thereby improving the processing efficiency of the storage system.

S105: Flushing the to-be-written data stored in the cache unit of the primary controller node to the storage expansion disk enclosure.

In some implementations, the primary controller node may flush each piece of to-be-written data separately into the hard disks of the storage expansion disk enclosure.

In other implementations, in order to improve efficiency, the to-be-written data may be flushed in batches into the hard disks of the storage expansion disk enclosure.

In some embodiments, when a number of a plurality of pieces of to-be-written data stored in the cache unit of the primary controller node reaches a predetermined threshold, the plurality of pieces of to-be-written data in the cache unit may be flushed into the storage expansion disk enclosure.

Alternatively, the plurality of pieces of to-be-written data in the cache unit may be flushed into the storage expansion disk enclosure at predetermined time intervals.

If, in the process of flushing the plurality of pieces of to-be-written data from the cache unit of the primary controller node, a target mirror controller node detects that the primary controller node fails, the target mirror controller node acts as a new primary controller node; a new target mirror controller node corresponding to the new primary controller node is then determined, and cache mirroring backup is performed; subsequently, the plurality of pieces of to-be-written data in the cache unit of the new primary controller node are flushed into the storage expansion disk enclosure, and none of the plurality of pieces of to-be-written data is redundantly stored in the storage expansion disk enclosure.

Figure 9:
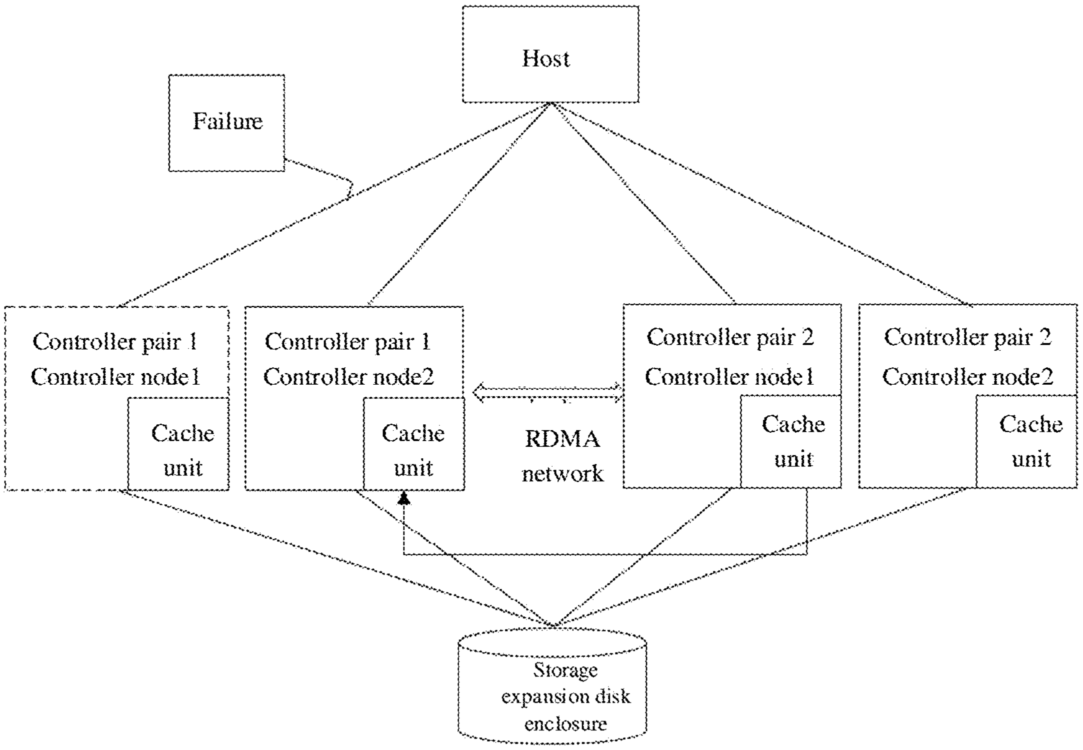
FIG. 9 is a schematic diagram of fault processing according to an embodiment of the present application.

Referring to FIG. 9, a schematic diagram of fault processing according to an embodiment of the present application is illustrated. If a primary controller node, namely a controller node 1 of a controller pair 1, fails, a target mirror controller node of the controller node 1 of the controller pair 1, namely a controller node 1 of a controller pair 2, may act as the new primary controller node. Since the controller node 1 of the controller pair 2 maintains cache mirroring backup of the to-be-written data, the controller node 1 of the controller pair 2 may continue to provide services to a host. At this time, in a four-controller storage array, only a single copy of the to-be-written data exists. To prevent loss of cache redundancy, a new target mirror controller node is selected for the new primary controller node (the controller node 1 of the controller pair 2). For example, preference is given to selecting a controller node not belonging to the same controller pair, such as a controller node 2 of the controller pair 1, as the target mirror controller node for cache mirroring backup of the to-be-written data.

Subsequently, the controller node 1 of the controller pair 2 may flush the to-be-written data into the storage expansion disk enclosure. However, when flushing a plurality of pieces of to-be-written data in batches, part of the data may have already been stored in the storage expansion disk enclosure. To avoid duplicate writing of the same to-be-written data, the controller node may detect whether any to-be-written data already exists in the storage expansion disk enclosure. If the data has already been written, the to-be-written data is ignored.

Figure 10:
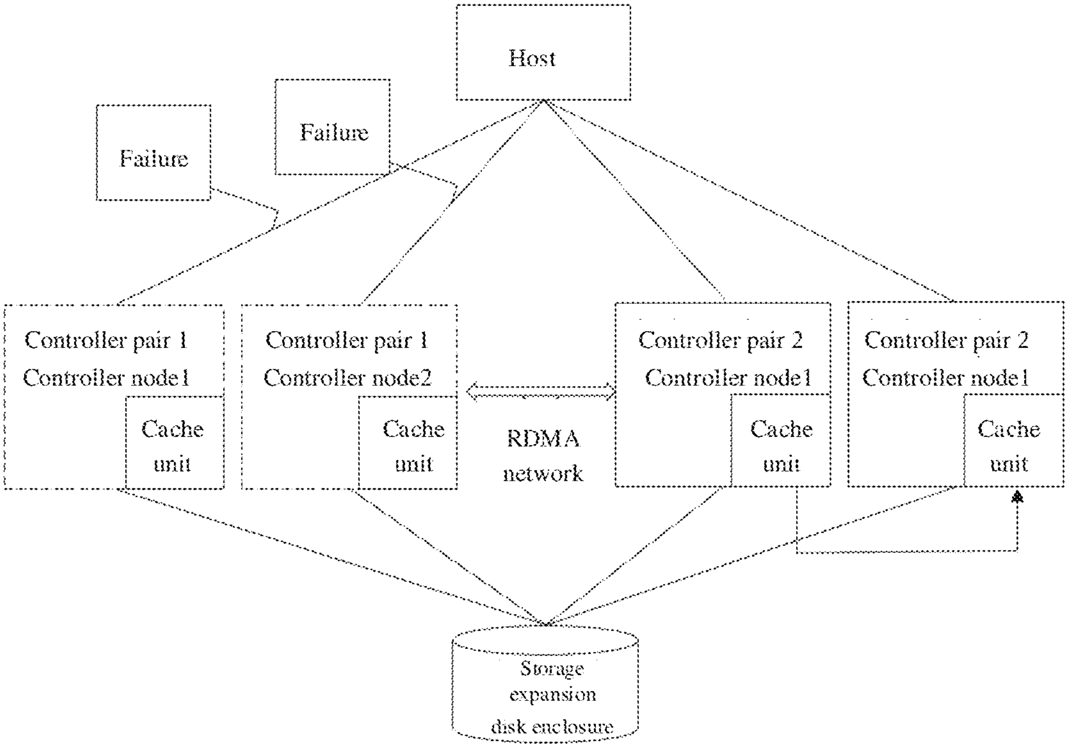
FIG. 10 is a schematic diagram of fault processing according to an embodiment of the present application.
Figure 11:
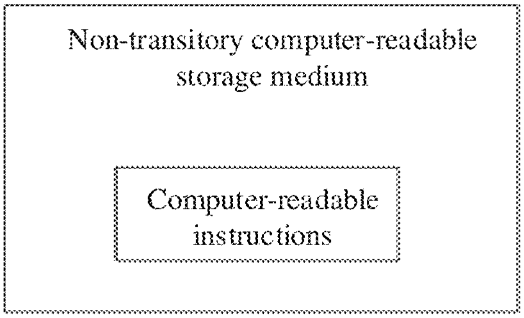
FIG. 11 is a schematic block diagram of a non-transitory readable storage medium according to an embodiment of the present application.

Referring to FIG. 10, a schematic diagram of failure processing according to an embodiment of the present application is illustrated. If a controller node 1 of a controller pair 2 selects a controller node 2 of a controller pair 1 as a target mirror controller node, and the controller node 2 of the controller pair 1 performs cache mirroring backup of to-be-written data, and subsequently both nodes of the controller pair 1 fail, only the two controller nodes of the controller pair 2 remain in a four-controller storage array. Since the controller node 1 of the controller pair 2 retains the cache mirroring backup of the to-be-written data, the controller node 1 of controller pair 2 might continue to provide services to a host. At this point, only one copy of the to-be-written data remains in the four-controller storage array. To prevent loss of cache redundancy, the other remaining controller node in the same controller pair (i.e., a controller node 2 of a controller pair 2) is selected to perform cache mirroring backup, to achieve cache redundancy protection.

In the multi-controller storage array provided in the embodiment, each controller node is connected to an expansion disk enclosure, enabling a plurality of controller nodes to share access to the expansion disk enclosure. Each controller node is further provided with a cache unit, and each controller node corresponds to a target mirror controller node, a cache unit of the target mirror controller node corresponding to each controller node stores a cache mirror of the cache unit of the controller node.

Compared with an existing loosely coupled multi-controller storage array, the multi-controller storage array provided in the embodiment allows each controller node to share access to hard disks of the expansion disk enclosure. Compared with an existing tightly coupled multi-controller storage array in which a plurality of controllers share one cache memory, in the multi-controller storage array of the embodiment, each controller node might perform cache mirroring backup on the cache unit of the corresponding target mirror controller node, thereby avoiding a situation in which a failure of one cache memory causes all controllers to fail, and achieving higher availability.

The embodiment of the present application further provides a non-transitory computer-readable storage medium. The non-transitory computer-readable storage medium stores computer-readable instructions which, when executed by a processor, perform the data processing method based on a multi-controller storage array according to the embodiment of the present application.

In this specification, various embodiments are described in a progressive manner, each of which focuses on a departure from the other embodiments, and reference should be made to the same or similar parts throughout the various embodiments.

Those skilled in the art should understand that the embodiments of the present application may be provided in the form of a method, an apparatus, or a computer-readable instruction product. Therefore, the present application may use the form of complete hardware embodiments, complete software embodiments, or software and hardware combination embodiments. Moreover, the embodiments of the present application may take the form of a computer-readable instruction product implemented on one or more computer-usable storage media (including but not limited to disk storage, CD-ROM, optical storage, and the like) including computer-usable program codes.

The embodiments of the present application are described with reference to the flowcharts and/or block diagrams of methods, terminal devices (systems), and computer-readable instruction products according to the embodiments of the present application. It should be understood that computer-readable instructions may implement each flow and/or each block in the flowcharts and/or the block diagrams, and combination of the flows and/or the blocks in the flowcharts and/or the block diagrams. These computer-readable instructions may be provided for a general computer, a dedicated computer, an embedded processor or processors of other programmable data processing terminal devices to generate a machine, thereby making the instructions that are executed by the computer or the processors of other programmable data processing terminal devices generate apparatuses for achieving specified functions in one or more flows of the flowcharts and/or one or more blocks of the block diagrams.

These computer-readable instructions also may be stored in a computer-readable memory capable of guiding the computer or other programmable data processing terminal devices to work in a specific manner, thereby making the instructions that are stored in the computer-readable memory generate manufactured products that include instruction apparatuses. The instruction apparatuses achieve the specified functions in one or more flows of the flowcharts and/or one or more blocks of the block diagrams.

These computer-readable instructions also may be loaded onto the computer or other programmable data processing terminal devices to execute a series of operation steps on the computer or other programmable data processing terminal devices to generate computer implemented processing, whereby the instructions executed on the computer or other programmable data processing terminal devices provide steps for achieving the specified functions in one or more flows of the flowcharts and/or one or more blocks of the block diagrams.

Although the alternatively embodiments of the present application have been described, those skilled in the art, upon learning the fundamental inventive concept, may make additional changes and modifications to these embodiments. Accordingly, the appended claims are intended to be construed as encompassing the alternatively embodiments as well as all changes and modifications that fall within the scope of the present application.

Finally, it is noted that relational terms such as first and second, and the like, may be used solely to distinguish one entity or action from another entity or action without necessarily requiring or implying any actual such relationship or order between such entities or actions. Furthermore, the terms "include", "comprise", or any other variation thereof, are intended to cover a non-exclusive inclusion, such that a process, method, article, or terminal device that comprises a list of elements does not include only those elements but may include other elements not expressly listed or inherent to such process, method, article, or terminal device. An element proceeded by "include a/an." does not, without more constraints, preclude the existence of additional identical elements in the process, method, article, or terminal device that includes the element.

The principle and implementations of the present application are elaborated with specific examples in the present application, and the descriptions made to the embodiments are only adopted to help the method of the present application and the core concept thereof to be understood. In addition, those of ordinary skill in the art may make variations to the specific implementation modes and the application scope according to the concept of the present application. In conclusion, the contents of the specification should not be understood as limits to the present application.

What is claimed is:

1. A multi-controller storage array, comprising a four-controller storage module, the four-controller storage module comprising two controller pairs and a storage expansion disk enclosure, wherein the two controller pairs are connected based on Ethernet;

each controller pair of the two controller pairs comprises two controller nodes, and each controller node is connected to the storage expansion disk enclosure to perform shared access to the storage expansion disk enclosure;

each controller node is provided with a cache unit, any controller node determines a target mirror controller node corresponding to the controller node in response to a write data request, and a cache mirror of the controller node is stored in a cache unit of the target mirror controller node;

the Ethernet is used for the shared access by all the controller nodes in the four-controller storage module to the storage expansion disk enclosure, as well as for any controller node in one controller pair to send to-be-written data, which is issued by a host, to the cache unit of any controller node in another controller pair of the two controller nodes for backup;

in response to the write data request, determining the target mirror controller node comprises:

preferentially selecting a controller node in a second controller pair different from the controller pair to which the controller node belongs as the target mirror controller node; and only when all controller nodes in the second controller pair have failed, selecting another controller node in the controller pair to which the controller node belongs as the target mirror controller node; and the multi-controller storage array is configured to be connected to the host, the host being configured with a multipath management thread, the multipath management thread being configured to select, among all controller nodes, a primary controller node for a current read/write operation process according to a data object or a service object involved in the current read/write operation process.

2. The storage array according to claim 1, wherein the storage array comprises two four-controller storage modules, wherein one controller pair in any one of the two four-controller storage modules is connected with one controller pair in a second one of the two four-controller storage modules based on the Ethernet.

3. The storage array according to claim 1, wherein the storage expansion disk enclosure comprises an Ethernet-based storage expansion disk enclosure.

4. The storage array according to claim 1, wherein any one controller pair of the two controller nodes is connected with another controller pair based on a remote direct memory access network.

5. The storage array according to claim 1, wherein the cache unit comprises a memory or a random-access device.

6. A storage system based on a multi-controller storage array, comprising a host and a multi-controller storage array, wherein the multi-controller storage array comprises:

a four-controller storage module, the four-controller storage module comprising two controller pairs and a storage expansion disk enclosure, wherein the two controller pairs are connected based on Ethernet;

each controller pair of the two controller pairs comprises two controller nodes, and each controller node is connected to the storage expansion disk enclosure to perform shared access to the storage expansion disk enclosure;

each controller node is provided with a cache unit, any controller node determines a target mirror controller node corresponding to the controller node in response to a write data request, and a cache mirror of the controller node is stored in a cache unit of the target mirror controller node;

the Ethernet is used for the shared access by all the controller nodes in the four-controller storage module to the storage expansion disk enclosure, as well as for any controller node in one controller pair to send to-be-written data, which is issued by the host, to the cache unit of any controller node in another controller pair of the two controller nodes for backup;

the host is separately connected to all controller nodes in the multi-controller storage array;

in response to the write data request, determining the target mirror controller node comprises:

preferentially selecting a controller node in a second controller pair different from the controller pair to which the controller node belongs as the target mirror controller node; and only when all controller nodes in the second controller pair have failed, selecting another controller node in the controller pair to which the controller node belongs as the target mirror controller node; and the host is configured with a multipath management thread, the multipath management thread being configured to select, among all controller nodes, a primary controller node for a current read/write operation process according to a data object or a service object involved in the current read/write operation process.

7. The storage system according to claim 6, wherein the multipath management thread is configured to select a predefined target controller node as the primary controller node.

8. The storage system according to claim 6, wherein the multipath management thread is configured to perform polling on all the controller nodes to determine the primary controller node for the current read/write operation process.

9. The storage system according to claim 6, wherein the multipath management thread is configured to select the primary controller node for the current read/write operation process among all the controller nodes according to a preset rule.

10. The storage system according to claim 9, wherein the multipath management thread is configured to acquire a current load of each of the controller nodes and select a controller node having a smallest current load as the primary controller node for the current read/write operation process.

11. The storage system according to claim 6, wherein the multipath management thread is configured to select the primary controller node for the current read/write operation process according to customized rules.

12. A data processing method based on a multi-controller storage array, wherein the method is applied to a storage system based on the multi-controller storage array, wherein the storage system comprises a host and a multi-controller storage array, wherein the multi-controller storage array comprises:

a four-controller storage module, the four-controller storage module comprising two controller pairs and a storage expansion disk enclosure, wherein the two controller pairs are connected based on Ethernet;

each controller pair of the two controller pairs comprises two controller nodes, and each controller node is connected to the storage expansion disk enclosure to perform shared access to the storage expansion disk enclosure;

each controller node is provided with a cache unit, any controller node determines a target mirror controller node corresponding to the controller node in response to a write data request, and a cache mirror of the controller node is stored in a cache unit of the target mirror controller node;

the Ethernet is used for the shared access by all the controller nodes in the four-controller storage module to the storage expansion disk enclosure, as well as for any controller node in one controller pair to send to-be-written data, which is issued by the host, to the cache unit of any controller node in another controller pair of the two controller nodes for backup;

the host is separately connected to all controller nodes in the multi-controller storage array;

the method comprises:

in response to the write data request issued by the host, acquiring, by any controller node serving as a primary controller node, the to-be-written data, and storing the to-be-written data in the cache unit of the controller node;

determining, by the primary controller node, the target mirror controller node corresponding to the primary controller node, comprising:

preferentially selecting a controller node in a second controller pair different from the controller pair to which the primary controller node belongs as the target mirror controller node; and only when all controller nodes in the second controller pair have failed, selecting another controller node in the controller pair to which the primary controller node belongs as the target mirror controller node;

performing, by the cache unit of the target mirror controller node, cache mirroring backup on the to-be-written data stored in the primary controller node;

transmitting, by the primary controller node, a completion response corresponding to the write data request to the host after backup is completed; and flushing the to-be-written data stored in the cache unit of the primary controller node to the storage expansion disk enclosure; and the host is configured with a multipath management thread, the multipath management thread being configured to select, among all controller nodes, the primary controller node for a current read/write operation process according to a data object or a service object involved in the current read/write operation process.

13. The method according to claim 12, wherein the flushing the to-be-written data stored in the cache unit of the primary controller node to the storage expansion disk enclosure comprises:

in response to a number of a plurality of pieces of to-be-written data stored in the cache unit of the primary controller node reaching a specified quantity, flushing the plurality of pieces of to-be-written data stored in the cache unit of the primary controller node to the storage expansion disk enclosure.

14. The method according to claim 13, wherein the flushing the plurality of pieces of to-be-written data stored in the cache unit of the primary controller node to the storage expansion disk enclosure comprises:

during the process of flushing the plurality of pieces of to-be-written data stored in the cache unit of the primary controller node, in response to the target mirror controller node detecting that the primary controller node fails, determining a new primary controller node;

re-determining a target mirror controller node corresponding to the new primary controller node and performing cache mirroring backup; and flushing a plurality of pieces of to-be-written data stored in a cache unit of the new primary controller node to the storage expansion disk enclosure, wherein none of the to-be-written data is redundantly stored in the storage expansion disk enclosure.

15. The method according to claim 12, wherein the flushing the to-be-written data stored in the cache unit of the primary controller node to the storage expansion disk enclosure comprises:

at each specified time interval, flushing a plurality of pieces of to-be-written data stored in the cache unit of the primary controller node to the storage expansion disk enclosure.

16. The method according to claim 12, wherein the determining, by the primary controller node, the target mirror controller node corresponding to the primary controller node comprises:

acquiring, by the primary controller node, a load condition corresponding to each of the controller nodes, and selecting a controller node having a minimum load as the target mirror controller node corresponding to the primary controller node.

17. A non-transitory computer-readable storage medium, wherein the non-transitory computer-readable storage medium stores computer-readable instructions which, when executed by a processor, perform the data processing method based on a multi-controller storage array according to claim 12.

* * * * *